(12) United States Patent
Erb, Jr. et al.

(10) Patent No.: US 7,632,766 B2
(45) Date of Patent: Dec. 15, 2009

(54) THERMAL AND ACOUSTIC INSULATION FABRIC

(75) Inventors: David F. Erb, Jr., Readfield, ME (US); Robert A. Gravel, Greene, ME (US); Eric D. Ritter, Monmouth, ME (US); Eric A. Barter, Winthrop, ME (US)

(73) Assignee: Tex Tech Industries, Inc., North Monmouth, ME (US)

( * ) Notice: Subject to any disclaimer, the term of this patent is extended or adjusted under 35 U.S.C. 154(b) by 0 days.

(21) Appl. No.: 11/744,656

(22) Filed: May 4, 2007

(65) Prior Publication Data

US 2007/0238380 A1    Oct. 11, 2007

Related U.S. Application Data

(63) Continuation of application No. 10/199,766, filed on Jul. 19, 2002, now abandoned.

(60) Provisional application No. 60/306,164, filed on Jul. 19, 2001.

(51) Int. Cl.
| | |
|---|---|
| *B32B 5/06* | (2006.01) |
| *B32B 5/26* | (2006.01) |
| *B32B 27/12* | (2006.01) |
| *D04H 1/46* | (2006.01) |
| *B64C 1/40* | (2006.01) |

(52) U.S. Cl. .............. 442/390; 442/381; 442/388; 442/389; 442/391; 442/392; 442/394; 442/396; 442/398; 442/402; 442/403; 442/404; 442/414; 442/415; 428/920; 428/921

(58) Field of Classification Search .............. 442/341, 442/342, 344, 348, 370, 372, 373, 381, 387, 442/388, 389–393, 394, 396, 397, 398, 402, 442/414, 415; 428/920, 921
See application file for complete search history.

(56) References Cited

U.S. PATENT DOCUMENTS

| | | | | |
|---|---|---|---|---|
| 4,948,649 | A | * | 8/1990 | Hiers et al. .............. 428/77 |
| 5,624,726 | A | * | 4/1997 | Sanocki et al. .............. 428/74 |
| 6,383,623 | B1 | * | 5/2002 | Erb, Jr. .............. 428/299.7 |
| 6,884,321 | B2 | * | 4/2005 | Erb et al. .............. 162/145 |

OTHER PUBLICATIONS

Certified Translation of WO 98/51631.*

* cited by examiner

*Primary Examiner*—Jennifer A Chriss
(74) *Attorney, Agent, or Firm*—Fitzpatrick, Cella, Harper & Scinto

(57) ABSTRACT

An insulating fabric which substantially prevents propagation of fire uses a blend of modified aluminum oxide-silica fibers and organic fibers in a multi-layer blanket.

21 Claims, 3 Drawing Sheets

THERMAL AND ACOUSTIC INSULATION FABRIC

This application claims the benefit of U.S. application Ser. No. 10/199,766, filed Jul. 19, 2002 which claims the benefit of U.S. Provisional Application No. 60/306,164, filed Jul. 19, 2001, both of which are incorporated by reference.

BACKGROUND OF THE INVENTION

1. Field of the Invention

This invention relates to a nonwoven fabric suited for use as an insulating layer, such as a thermal and acoustic insulating layer in an aircraft fuselage.

2. Description of the Related Art

Blankets providing thermal and/or acoustic insulation are used in aircraft and other vehicles to protect passengers from exterior environmental temperature extremes and to dampen engine noise.

As described in U.S. Pat. No. 5,169,700 ("Faced Fiber Glass Insulation") and U.S. Pat. No. 5,108,821 ("Self-Extinguishing Blanket Enclosed With Plastic Films"), both incorporated herein by reference, prior art insulation blankets typically comprise a batting of a fibrous material such as fiberglass, and a film covering which serves to resist the uptake of moisture by the batting material.

Among the drawbacks of the prior art insulation blankets is that, depending on the materials of construction, the blankets may contribute to the propagation of a fire by providing a pathway into the cabin of the aircraft. Metallized polyethylene terephthalate (PET) films found on such fabric, for example, have been known to propagate fire.

U.S. Pat. No. 5,624,726 and U.S. Pat. No. 5,759,659, herein incorporated by reference, describe an insulation blanket comprising a lofty batting of thermoplastic fibers and a high temperature resistant layer of ceramic oxide fibers, encased within a heat-sealable, flame retardant, rubber-toughened thermoplastic polyolefin polymer. While some of these fabrics may be effective in preventing burn-through, their effectiveness in preventing the propagation of fire when exposed to a flame under a radiant heat source is dependant on the durability of the thin ceramic layer.

U.S. Pat. No. 5,904,318, herein incorporated by reference, discloses a reinforced skin structure containing insulation comprising heat-stabilized, oxidized polyacrylonitrile (PAN) fibers. While PAN fibers work well in preventing burn-through of fire into an aircraft cabin interior, oxidized PAN fiber may alter the pH of condensate contacting it, resulting in accelerated corrosion of the skin of the aircraft. Moreover, toxic gases including cyanogen, carbon monoxide, and nitrogen oxide are possible byproducts of a fire involving nitrogen-containing synthetics such as oxidized PAN.

Insulation blankets made of commodity inorganic fibers such as fiberglass are irritating to the touch and difficult to process on textile equipment. The fibers fracture easily in the process of manufacturing the blanket assembly, during installation, or whenever they are handled.

Commercially available insulation materials which contain fiberglass, glass wool, and other inorganic fibers also typically cause irritation of the skin, eyes, nose, and mouth.

In addition to causing irritation of the skin, there is a health risk associated with glass fibers when broken fragments become airborne. Glass fibers have a propensity to fracture and create dust due to their brittle nature. These fiber fines, when inhaled, pose a serious risk to human health because they are capable of entering the lungs, leading to a chronic condition known as silicosis. For example, a rotary glass fiber commonly used in aircraft insulation has a mean fiber diameter of 4.7 microns and a standard deviation of 2.0 microns. As fibers having a diameter below 3 microns are within the respirable range, a significant portion of these fiber fines is within the respirable range.

Aircraft using conventional insulation blankets accumulate, and frequently fly with, more than a ton of moisture vapor condensate within saturated, soggy, matted and collapsed blankets.

Thus, there has been a long felt need in the industry for an improved insulation material; one which offers improved resistance to fire propagation while overcoming the above-mentioned limitations of the prior art.

SUMMARY OF THE INVENTION

An object of the present invention is to provide thermal and acoustic protection with a novel fabric that will not contribute to the propagation of a fire. Preferred fabrics according to the invention pass new proposed changes to the Federal Aviation Administration's radiant panel test described in 14 C.F.R., Appendix F to Part 25 thereof. These changes to the rule are described in a Notice of Proposed Rulemaking published in the Federal Register at Vol. 65, No. 183 (Sep. 20, 2000), pages 56992-57022, herein incorporated by reference.

Another object of the invention is to provide an insulation fabric that repels water, and thereby prevents the insulation from becoming saturated with large quantities of condensate, improving the corrosion resistance of the aircraft skin, as well as improving fuel efficiency and payload capacity of an aircraft.

A further object of the invention is to provide an insulation that is soft, non-abrasive, and pleasant to the touch, and which is readily processed on standard textile manufacturing equipment.

A further object of the invention is to provide an insulating material having fiber diameters large enough so that particles formed from the insulation are safely above the respirable range of 3 microns or less.

These and other objects are achieved by a fireblocking insulation material which comprises at least a first nonwoven batt having modified aluminum oxide-silica fibers present in an amount between about 1.0 percent by weight and 95.0 percent by weight and organic fibers present in an amount between about 5.0 percent by weight and about 99.0 percent by weight. The preferred aluminum oxide-silica fibers are modified by an extraction with acid, as described in WO 98/51631, herein incorporated by reference.

In preferred embodiments, the insulation material comprises a plurality of layers including at least one nonwoven batting layer having a mixture of the modified aluminum oxide-silica fibers, organic fibers, and at least one further nonwoven batting layer consisting essentially of organic fibers.

The organic fibers used may be any commonly used in the art, although meta-aramid fibers, para-aramid fibers and mixtures thereof are preferred for many fireblocking applications.

In preferred embodiments, a water repellent coating is applied to the insulation material and cured. In other preferred embodiments, the insulation material comprises an acoustic dampening layer between layers of batting material, and a facing layer to resist the uptake of moisture by the batting layers. The material may also comprise a scrim as structural support.

Although this invention is particularly described in connection with aircraft applications, it is also suited for many other applications including, without limitation, insulating fabric in other transportation vehicles such as race cars, automobiles, trains, and buses; insulating fabric in spacecraft such as the space shuttle or rockets; protective clothing applications including firefighters' turnout coats and other gear; protective suits worn by racecar drivers, astronauts, and the like; protective garments such as gloves, aprons, and gaiters worn in welding applications or the metal-working industry; ingot moulds; survival suits worn by mariners or military rescue personnel; insulating bedding material; sleeping bags; filtration fabrics, including those used in the electrical power generating industry; pipe insulation; high-pressure steam line insulation; door seals for furnaces, ovens, broilers, boilers; fire and heat-source protection for firefighters' and other hoses; and thermal protection of electrical wires/cables.

Further objects and advantages of this invention will become apparent from a consideration of the drawings and the following description.

DETAILED DESCRIPTION OF THE INVENTION

Figure 1:
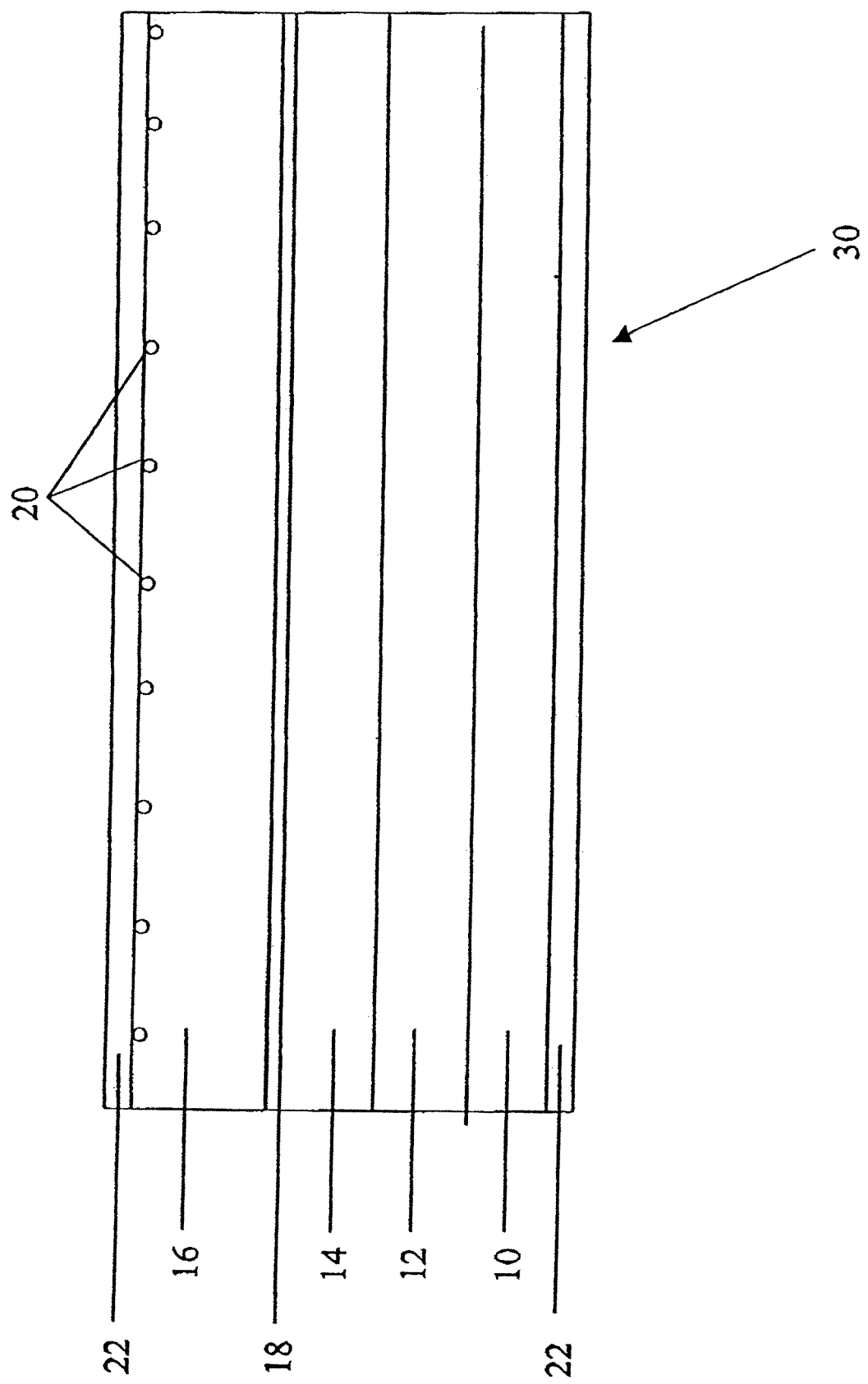
FIG. 1 is a cross sectional view of an insulation fabric in accordance with the invention.

Referring to FIG. 1, the insulating fabric (30) contains at least one lofty nonwoven batt (10) consisting of a blend of at least one type of organic fiber and a high performance inorganic fiber. Any number of additional batts (12), (14), (16) may be mechanically needled to or otherwise entangled with the fibers of the first batt to produce an insulating fabric of multiple layers. The additional batts contain organic fibers or a combination of organic and inorganic fibers.

In preferred embodiments of the invention, the inorganic fiber is a modified aluminum oxide silica fiber comprising at least 1% by weight of the nonwoven fabric layer(s) containing it. Most preferred is a high performance silica fiber commercially available as belCoTex® from belChem Fibers GmbH of Germany.

The standard version of belCoTex® is an acid-extracted $Al_2O_3$-modified (aluminum oxide-modified) silicic acid derived staple fiber pre-yarn. In the standard form, the glassy characteristic nature of the fiber has been completely overcome by an acid extraction step. This fiber provides long-term temperature resistance at 1000° C., yet possesses a soft, fleecy, voluminous character that makes it both pleasant to the touch and easily processable on textile equipment. The modified $SiO_2$ (silica) network of belCoTex® allows for OH (hydroxyl) groups and $H_2O$ (water) molecules to become incorporated. This contributes to the softness of the fiber, its pleasant hand, and the ease with which it is processed on textile equipment. The mean fiber diameter of belCoTex® is 9.2 microns and the standard deviation is 0.4 microns; as a result it does not carry the health risks associated with glass fibers having fiber diameter distributions that extend into the respirable range. Preferred fibers for use with the invention are described in WO 98/51631, herein incorporated by reference. Particularly preferred is an acid-extracted silica-based fiber having about 70-75 weight percent $SiO_2$, about 15-25 weight percent $Na_2O$ (or $K_2O$), and about 1-5 weight percent of $Al_2O_3$.

Preferred embodiments contain blends of 5-95% inorganic modified aluminum oxide fibers such as belCoTex® and 5-95% organic staple fibers as described above. The most preferred embodiments of this invention contain 15-50% belCoTex® aluminum oxide-modified silica fibers.

An acoustic dampening layer (18) may be incorporated into the insulating fabric positioned between multiple batts or on an exterior face of the fabric. The dampening layer may be adhered to the fabric by means such as adhesive glue, or by alternative methods. For example, the dampening layer may be directly cast onto the fibers, it may be mechanically attached, i.e., by needling or stitching, or it may be thermally bonded. Multiple dampening layers may be used if desired.

A supporting scrim (20) may be incorporated into the insulating fabric. If used, the scrim may be positioned either on an exterior face, between layers, or any combination thereof. The insulating fabric may contain no scrim, one, or multiple scrims. The scrim is generally a loosely woven fabric (without limitation, typically on the order of 5-20 picks per inch in the warp and weft directions) providing structural integrity to the finished insulation.

A film or facing layer (22) may be incorporated into the insulating fabric. The facing layer serves to improve the sound transmission loss of the insulating fabric and also allows for the insulating fabric to be easily cleaned by wiping it with a cloth. The facing layer is preferably made from poly(vinylfluoride) (PVF), poly(etheretherketone) (PEEK), or polyimide film such as Kapton® available from DuPont, but may be made from other materials including, without limitation, fire retardant polyolefin films, polyimide films, and other films known to those in the art. Glass or other fibers may be incorporated into such films for additional strength and support. The facing layer may cover one or more sides of the insulating fabric, or may completely enclose it for additional protection. An insulating fabric enclosed with such a film will be further protected against water vapor condensation.

In preferred embodiments of the invention the organic fibers used in all of the layers are organic staple fibers of poly m-phenylene isophthalamide, poly p-phenylene terephthalamide, commonly referred to as meta-aramid and para-aramid fibers respectively or blends thereof. Alternatively, other organic fibers may be used, including without limitation, blends of melamine, polyimide, polybenzimidazole (PBI), polyphenylenebenzobizoxazole (PBO), carbon, polyphenylene sulfide (PPS or sulfar), poly etheretherketone (PEEK), novoloid (Kynol®), saran, polytetrafluoroethylene (PTFE, fluorocarbon), polyamide imide (Kermel®), modacrylics, vinal, Visil®, wool, or treated cotton fibers.

The felt batts of the insulating fabric are also further processed to impart a hydrophobic character to the fibers for water repellency. A fluoropolymer treatment, silicone coating, or other means may be used to impart water repellency.

Finished fabrics according to the invention are operable over a wide range of thicknesses and weights per unit area. Generally, fabrics according to the invention have a weight range between 2.0 and 100.0 oz/yd². The weight in some instances will be dictated by the application, so that a wearable fire-protective suit might use fabric having a weight in the 2.0 to 10.0 oz/yd² range, while an insulation material in the foundry industry might range between 50.0 oz/yd² to 100.0 oz/yd² or higher. Preferred fabrics in the aviation industry typically range between about 20.0 oz/yd² and about 50.0 oz/yd². The thickness of fabrics according to the invention typically ranges between about 0.05 and about 2.0 inches. Preferred fabrics for use in aircraft generally have a thickness between about 0.10 and about 2.0 inches, more preferably between about 0.5 and about 2.0 inches.

EXAMPLES

The following examples were produced (or designed) using several fiber blends. All percentages are in terms of total fiber weight percent, unless otherwise noted. These examples, actual or prophetic, are not to be deemed limiting of the invention.

A first fiber blend A was prepared according to the following formula: 100% poly(m-phenylene isophthalamide) staple fiber, 5.5 denier×3 inches in length. It will be understood that a "blend," as used herein is a term of art which can refer to a nonwoven batt consisting of one type of organic fiber A second fiber blend B was prepared according to the formula: 85% poly (m-phenylene isophthalamide) staple fiber, 1.5 denier×1.5 inches in length; and 15% poly(m-phenylene isophthalamide) staple fiber, 2 denier×3 inches in length.

A third fiber blend C was prepared according to the formula: 95% poly (m-phenylene isophthalamide) staple fiber, 5.5 denier×3 inches; and 5% belCoTex® fiber, average fiber diameter of 9 micrometers×2.5 inches.

A fourth fiber blend D was prepared according to the formula: 90% poly (m-phenylene isophthalamide) staple fiber, 5.5 denier×3 inches; and 10% belCoTex® fiber, average fiber diameter of 9 micrometers×2.5 inches.

A fifth fiber blend E was prepared according to the formula: 85% poly (m-phenylene isophthalamide) staple fiber, 5.5 denier×3 inches; and 15% belCoTex® fiber, average fiber diameter of 9 micrometers×2.5 inches.

A sixth fiber blend F was prepared according to the formula: 80% poly (m-phenylene isophthalamide) staple fiber, 5.5 denier×3 inches; and 20% belCoTex® fiber, average fiber diameter of 9 micrometers×2.5 inches.

A seventh fiber blend G is prepared according to the formula: 50% poly (m-phenylene isophthalamide) staple fiber, 5.5 denier×3 inches; and 50% belCoTex® fiber, average fiber diameter of 9 micrometers×2.5 inches.

An eighth fiber blend H is prepared according to the formula: 90% belCoTex® fiber, average fiber diameter of 9 micrometers×2.5 inches, and 10% poly(p-phenylene terephthalamide) staple fiber, 1.5 denier×2.36 inches in length.

A ninth fiber blend I is prepared according to the formula: 50% poly (m-phenylene isophthalamide) staple fiber, 5.5 denier×3 inches in length, 25% polybenzimidazole staple fiber, 1.5 denier×3 inches in length, 25% belCoTex® fiber, average fiber diameter of 9 micrometers×2.5 inches.

The foregoing blends A-I are tabulated on Table 1 below:

TABLE 1

| Blend | Meta-aramid[1] (wt %) | Para-aramid[2] (wt %) | belCoTex[5] (wt %) | PBI |
|---|---|---|---|---|
| A | 100 | 0 | 0 | 0 |
| B | 85[4], 15[3] | 0 | 0 | 0 |
| C | 95 | 0 | 5 | 0 |
| D | 90 | 0 | 10 | 0 |
| E | 85 | 0 | 15 | 0 |
| F | 80 | 0 | 20 | 0 |
| G | 50 | 0 | 50 | 0 |
| H | 0 | 10 | 90 | 0 |
| I | 50 | 0 | 25 | 25 |

[1] 5.5 denier × 3 inches, except as otherwise noted
[2] 1.5 denier × 2.36 inches
[3] 2.0 denier × 3 inches
[4] 1.5 denier × 3 inches
[5] 9 μm × 2.5 inches Poly(m-phenylene isophthalamide) staple fiber is commercially available as Nomex® from E.I. DuPont of Wilmington, Del., or as Conex® from Teijin Fiber Limited of New York, N.Y.; belCoTex® fiber is available from belChem Fiber Materials GmbH of Germany; poly(p-phenylene terephthalamide) staple fiber is available as Kevlar® from E.I. DuPont of Wilmington, Del.; polybenzimidazole staple fiber is available as PBI® from Celanese Acetate of Charlotte, N.C.

Example 1

A first nonwoven felt batt is produced from fiber blend A having a mass per unit area of from 11.0 to 12.0 oz/yd². A second nonwoven felt batt is produced from fiber blend E having a weight of from 11.0 to 12.0 oz/yd². The felt batts are then placed in intimate contact and mechanically needle punched according to methods well known by those skilled in the art to a needled weight of from 20.5 to 23.5 oz/yd² and a needled thickness of from 0.575 to 0.725 inches.

A fluoropolymer treatment is then applied to the needled fabric as a means of imparting water repellency to the fabric. The treatment consists of 2.5% by volume Zonyl® RN, available from E.I. DuPont, and 97.5% by volume water. Wet pickup is 100% based on the weight of the fabric. The treated fabric is then oven dried and cured at 450 to 475 degrees Fahrenheit. The weight of the treated fabric is from 17.5 to 21.5 oz/yd², and the thickness is from 0.500 to 0.650 inches. It may be noted that the fabric loses weight during the treatment and drying/curing processes due to the effects of tension and stretching. The first and second batts produced from fiber blends A and E were then pulled apart in order to insert an acoustic dampening layer.

A thermoplastic poly(vinylchloride) elastomer having a mass per unit area of about 12 to 15 oz/yd² and a thickness of approximately 0.012 to 0.015 inches is positioned between the first and second nonwoven batts. One example of such a material is Isodamp® C-1002 available from E-A-R Specialty Composites of Indianapolis, Ind. Other dampening materials may be used; for example, polyurethane, other foams, films, or elastomeric materials. The elastomeric dampening material was adhered between the batts with a spray adhesive, available as Sta'-Put IV® Multipurpose Spray Adhesive SP4H from TACC International Corporation of Rockland, Mass. The finished insulating fabric had a weight of from 24.3 to 29.7 oz/yd² and a thickness of from 0.625 to 0.825 inches. It may be noted that the finished insulating fabric loses weight, again from the effects of stretching the felt layers.

Example 2

A first nonwoven felt batt is produced from fiber blend A having a mass per unit area of from 10.5 to 11.5 oz/yd². A second nonwoven felt batt is produced from fiber blend E having a weight of from 10.5 to 11.5 oz/yd². The felt batts are then placed in intimate contact and mechanically needle punched according to methods well known by those skilled in the art to a needled weight of from 20.5 to 23.5 oz/yd² and a needled thickness of from 0.575 to 0.725 inches.

A fluoropolymer treatment is applied as in Example 1. The finished weight of the treated fabric is from 17.5 to 21.5 oz/yd², and the finished thickness is from 0.500 to 0.650 inches.

Example 3

A first nonwoven felt batt is produced from fiber blend B having a mass per unit area of from 11.6 to 12.8 oz/yd². A second and a third batt are also produced having the same construction as said first batt. A fourth nonwoven felt batt is produced from fiber blend I having a weight of from 7.0 to 8.2 oz/yd$^2$. The three felt batts produced from fiber blend B are then placed in intimate contact with the fourth felt batt produced from fiber blend I positioned against the outermost face of the three stacked batts of blend B. The four batts are then mechanically needle punched according to methods well known by those skilled in the art to a needled weight of from 40.6 to 44.0 oz/yd$^2$ and a needled thickness of from 1.125 to 1.500 inches.

A fluoropolymer treatment is applied as in Example 1. The finished weight of the treated fabric is from 35.1 to 42.9 oz/yd$^2$, and the finished thickness is from 1.120 to 1.380 inches.

Example 4

A first nonwoven felt batt was produced from fiber blend C having a mass per unit area of from 11.6 to 12.8 oz/yd$^2$. A second and a third batt were also produced having the same construction as said first batt. A fourth nonwoven felt batt was produced from fiber blend B having a weight of from 7.0 to 8.2 oz/yd$^2$. The three felt batts produced from fiber blend C were then placed in intimate contact, with the fourth felt batt produced from fiber blend B positioned against the outermost face of the three stacked batts of blend C. The four batts were then mechanically needle punched according to methods well known by those skilled in the art to a needled weight of from 40.6 to 44.0 oz/yd$^2$ and a needled thickness of from 1.125 to 1.500 inches.

A fluoropolymer treatment was applied as in Example 1. The finished weight of the treated fabric was from 35.1 to 42.9 oz/yd$^2$, and the finished thickness was from 1.120 to 1.380 inches.

Example 5

This example was produced in the same manner as example 4, except fiber blend C was replaced with fiber blend D. All other conditions including treatment and drying/curing remained the same for Example 5 as for Example 4.

Example 6

This example was produced in the same manner as example 4, except fiber blend C was replaced with fiber blend E. All other conditions including treatment and drying/curing remained the same for example 6 as for example 4.

Example 7

This example was produced in the same manner as example 4, except fiber blend C was replaced with fiber blend F. All other conditions including treatment and drying/curing remained the same for example 7 as for example 4.

Example 8

A first nonwoven felt batt is produced from fiber blend D having a mass per unit area of approximately 11.6 to 12.8 oz/yd$^2$. A second and a third batt are also produced having the same construction as said first batt. A fourth nonwoven felt batt is produced from fiber blend F having a weight of approximately 7.0 to 8.2 oz/yd$^2$. The three felt batts produced from fiber blend D are placed in intimate contact, with the fourth felt batt produced from fiber blend F positioned against the outermost face of the three stacked batts of blend D. The four batts are then mechanically needle punched according to methods well known by those skilled in the art to a needled weight of approximately 40.6 to 44.0 oz/yd$^2$ and a needled thickness of about 1.125 to 1.500 inches.

A fluoropolymer treatment is applied as in Example 1. The finished weight of the treated fabric is from 35.1 to 42.9 oz/yd$^2$, and the finished thickness is from 1.120 to 1.380 inches.

Example 9

This example is produced in the same manner as Example 1, except fiber blends A and E are replaced with fiber blend G. A treatment is applied to impart hydrophobic character to the fibers and a sound dampening foam is used as in Example 1.

Example 10

A first nonwoven felt batt is produced from fiber blend H having a mass per unit area of approximately 10.5 to 11.5 oz/yd$^2$. A second nonwoven felt batt is produced having the same construction as the first batt. A scrim woven of 100% meta-aramid yarn such as Conex® using a plain weave is used to support the fabric. The mass per unit area of the scrim is 2.1 oz/yd$^2$ with a construction of 22 ends per inch and 14 picks per inch. The felt batts are placed in intimate contact with one another and the scrim is placed against an exterior face of the two batts. The resulting composite is mechanically needle punched according to methods well known by those skilled in the art to a needled weight of approximately 22.6 to 25.6 oz/yd$^2$ and a needled thickness of approximately 0.575 to 0.725 inches.

A fluoropolymer treatment is applied as in Example 1. The finished weight of the treated fabric is approximately 17.5 to 21.5 oz/yd$^2$, and the finished thickness is approximately 0.500 to 0.650 inches.

Preferred fabrics according to the invention exhibit reduced flame propagation. More specifically, a sample of a fabric according to preferred embodiments of the invention, when exposed to a radiant heat source and a separate ignition source, shows no flaming beyond 2 inches to the left of a centerline of a point of pilot flame application. Additionally, samples tested exhibited greatly improved performance in reducing the spread of flames on the surface of the material, and exhibited significantly shorter afterflames. Fabrics according to the invention when subjected to such ignition source for a period of 15 seconds, exhibit afterflame times of preferably less than 5 seconds, more preferably less than 3 seconds, and most preferably exhibit no afterflame at all.

Figure 2:
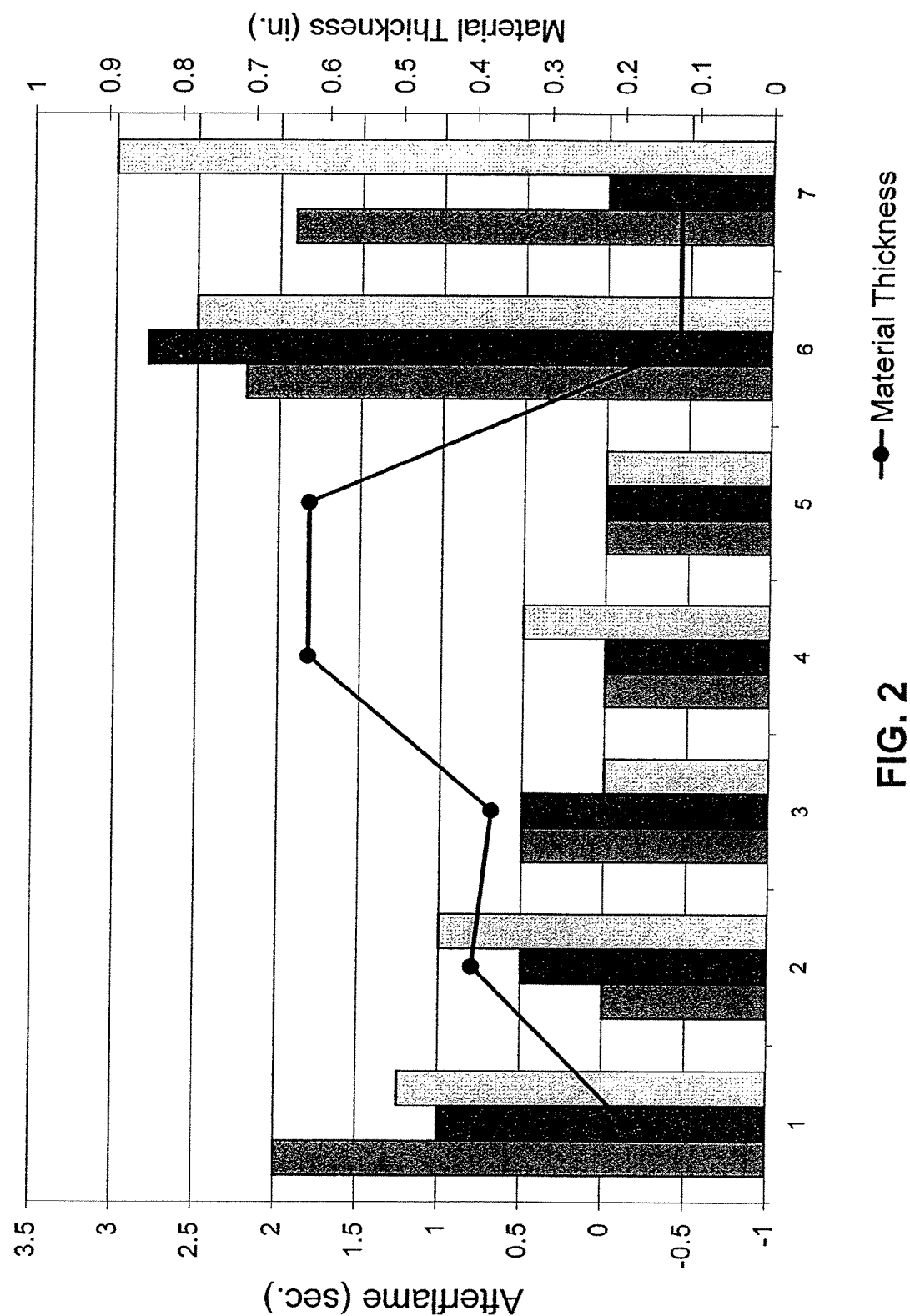
FIG. 2 and FIG. 3 are graphs of test results of FAA radiant panel tests conducted on insulating fabrics according to the invention.
Figure 3:
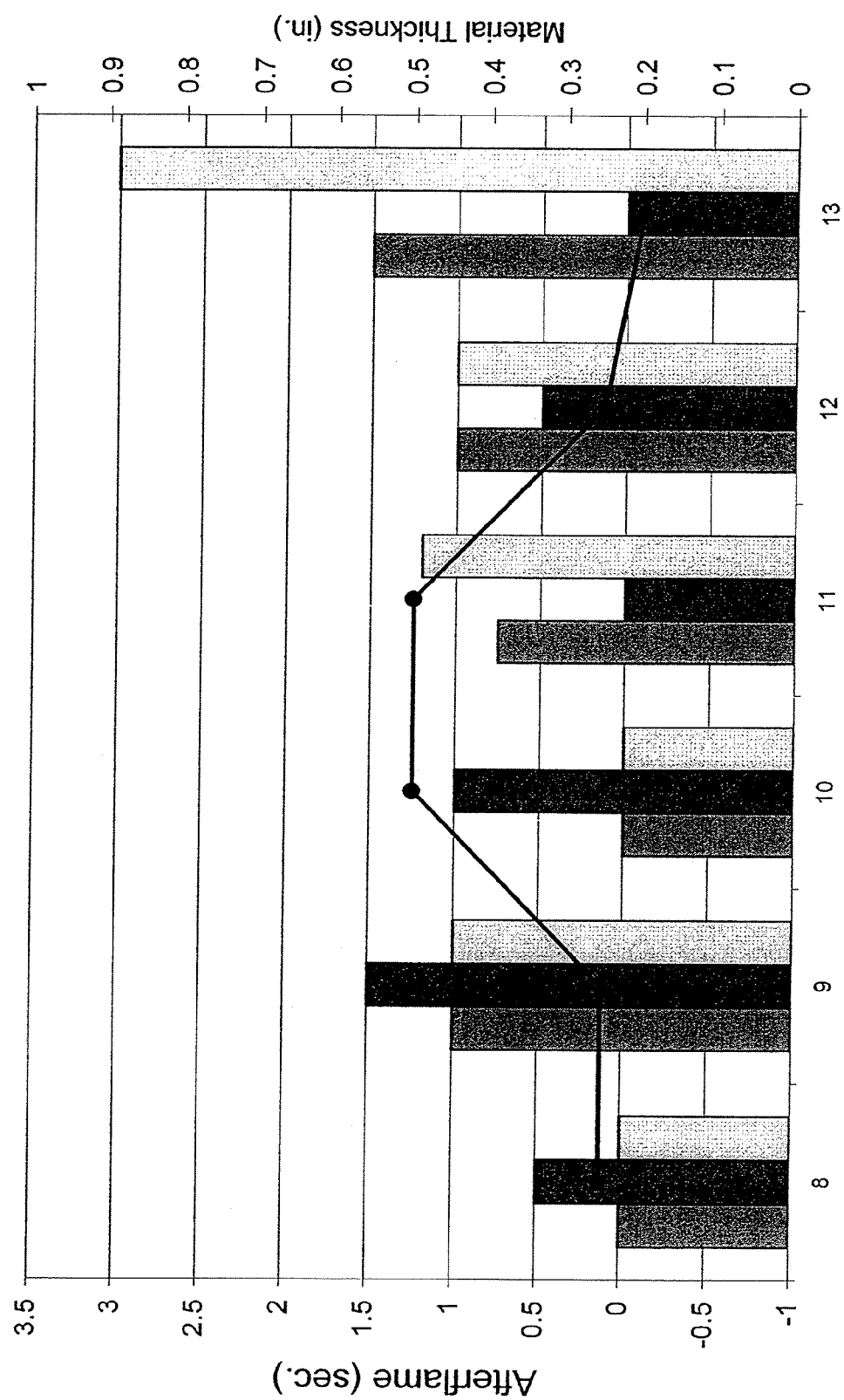

Testing of material blends comprising 15% and 20% additions of belCoTex® fibers into standard meta-aramid (NOMEX®) fibers was conducted in accordance with the proposed changes to the Federal Aviation Administration's radiant panel test. The results of the testing are shown in FIG. 2 and FIG. 3, where the fiber composition and fabric thickness are as set forth in Table 2 below. Three iterations of the test were performed on each sample, each of which is represented by a separate bar on the bar graph.

TABLE 2

| | Sample No. | | | | | | |
|---|---|---|---|---|---|---|---|
| | 1 | 2 | 3 | 4 | 5 | 6 | 7 |
| Blend | 15% Belcotex® 85% Nomex® | 15% Belcotex® 85% Nomex® | 20% Belcotex® 80% Nomex® | 20% Belcotex® 80% Nomex® | 15% Belcotex® 85% Nomex® | 20% Belcotex® 80% Nomex® | 15% Belcotex® 85% Nomex® |
| Thickness | .187" | .4" | .375" | .625" | .625" | .125" | .125" |
| | After Flame | | | | | | |
| Iteration 1 | 2 | 0 | 0.5 | 0 | 0 | 2.2 | 1.9 |
| Iteration 2 | 1 | 0.5 | 0.5 | 0 | 0 | 2.8 | 10 |
| Iteration 3 | 1.25 | 1 | 0 | 0.5 | 0 | 2.5 | 3 |

| | Sample No. | | | | | |
|---|---|---|---|---|---|---|
| | 8 | 9 | 10 | 11 | 12 | 13 |
| Blend | 20% Belcotex® 80% Nomex® | 15% Belcotex® 85% Nomex® | 20% Belcotex® 80% Nomex® | 15% Belcotex® 85% Nomex® | 20% Belcotex® 80% Nomex® | 20% Belcotex® 80% Nomex® |
| Thickness | .25" | .25" | .5" | .5" | .25" | .2" |
| | After Flame | | | | | |
| Iteration 1 | 0 | 1 | 0 | 0.75 | 1 | 1.5 |
| Iteration 2 | 0.5 | 1.5 | 1 | 0 | 0.5 | 0 |
| Iteration 3 | 0 | 1 | 0 | 1.2 | 1 | 3 |

The data shows an improvement in performance over standard products that do not contain the inorganic fiber blend. All of the fabrics tested without addition of the modified silica fibers exhibited significantly longer afterflame times when subjected to the radiant panel test.

The foregoing examples and detailed description are not to be deemed limiting of the invention which is defined by the following claims. The invention is understood to encompass such obvious modifications thereof as would be apparent to those of ordinary skill in the art.

What is claimed is:

1. A fireblocking insulation material for an aircraft comprising a plurality of layers consolidated by needle punching, including at least a first nonwoven batt having a blend of modified aluminum oxide-silica fibers present in an amount between about 1.0 percent by weight and 95.0 percent by weight and organic fibers present in an amount between about 5.0 percent by weight and about 99.0 percent by weight, said insulation material having an outer surface resistant to flame propagation.

2. The insulation material of claim 1 comprising a plurality of layers and including at least one layer which consists essentially of a blend of organic fibers.

3. The insulation material of claim 1, wherein at least said first nonwoven batt is coated with a water resistant coating.

4. The insulation material of claim 3, wherein said water resistant coating is a cured fluoropolymer coating.

5. The insulation material of claim 1, wherein said modified aluminum oxide-silica fibers are acid-extracted.

6. The insulation material of claim 5, wherein said modified aluminum oxide-silica fibers comprise about 70-75 percent by weight silica, 1-5 percent by weight aluminum oxide and 15-25 percent by weight $Na_2O$.

7. The insulation material of claim 1 comprising a plurality of layers, more than one of said plurality of layers comprising a blend of organic fibers and modified aluminum oxide-silica fibers, and at least one of said plurality of layers consisting essentially of organic fibers.

8. The insulation material of claim 1, said nonwoven batt having a weight per unit area between about 2.0 oz/yd$^2$ and about 15.0 oz/yd$^2$, and said insulation material having a weight per unit area between about 2.0 oz/yd$^2$ and about 100.0 oz/yd$^2$, and said insulation material having a thickness between about 0.05 to about 2.0 inches.

9. The insulation material of claim 1, said nonwoven batt having a weight per unit area between about 2.0 oz/yd$^2$ and about 15.0 oz/yd$^2$ and said insulation material having a weight per unit area between about 20.0 and about 30.0 oz/yd$^2$ and a thickness between about 0.05 inch and about 2.0 inch.

10. The insulation material of claim 1, said nonwoven batt having a weight per unit area between about 10.0 oz/yd$^2$ and about 15 oz/yd$^2$ and said insulation material having a weight per unit area between about 30.0 and about 50.0 oz/yd$^2$ and a thickness between about 0.1 inch and about 2.0 inch.

11. The insulation material of claim 1, further comprising an acoustic dampening layer.

12. The insulation material of claim 11, wherein said acoustic dampening layer comprises a layer of poly(vinylchloride), or polyurethane foam positioned between nonwoven layers of the insulation material.

13. The insulation material of claim 1, further comprising at least one woven scrim supporting layer.

14. The insulation material of claim 1, further comprising a water resistant and acoustic dampening facing film.

15. The insulation material of claim 14, wherein said facing film is made from poly(vinylfluoride), poly(etheretherketone), polyimide, or fire retardant polyolefin and covers at least one side of said insulation material.

16. The insulation material of claim 1, wherein said organic fibers comprise poly m-phenylene isophthalamide fibers, poly p-phenylene terephthalamide fibers, polybenzimidazole fibers, or a mixture thereof.

17. The insulation material of claim 1, exhibiting reduced flame propagation to meet changes to the Federal Aviation Administration radiant panel test set forth in 14 C.F.R., Part 25, Appendix F thereof.

18. The insulation material of claim 1, exhibiting reduced flame propagation when exposed to a radiant heat source and a separate ignition source, such that when said ignition source is applied for a period of about 15 seconds, the fabric exhibits an afterflame of less than about 3 seconds.

19. A fireblocking insulation material for an aircraft having a plurality of layers comprising:
- a first nonwoven batt having a mass per unit area from about 10.0 to about 15.0 oz/yd$^2$ and comprising about 15.0 to about 50.0 percent by weight modified aluminum oxide-silica fibers having a mean fiber diameter of about 9 microns, blended with about 50.0 to about 85.0 percent by weight poly m-phenylene isophthalamide fibers, poly p-phenylene terephthalamide fibers, polybenzimidazole fibers, or a mixture thereof, and having an outer surface resistant to flame propagation; and
- at least one additional nonwoven batt comprising organic fibers,
- said first nonwoven batt and said at least one additional nonwoven batt needled together with an acoustic dampening layer and coated with a waterproof coating.

20. The insulation material of claim 19, further comprising a poly(vinylfluoride), poly(etheretherketone) or polyimide facing film forming the outer face of the insulation material.

21. The insulation material of claim 20, further comprising a supporting scrim.

* * * * *